(12) United States Patent
Maekawa et al.

(10) Patent No.: US 8,860,281 B2
(45) Date of Patent: Oct. 14, 2014

(54) MULTIPLE-GAP ELECTRIC ROTATING MACHINE

(71) Applicant: Denso Corporation, Kariya (JP)

(72) Inventors: Takeo Maekawa, Okazaki (JP); Shin Kusase, Obu (JP); Keiji Kondou, Toyota (JP)

(73) Assignee: Denso Corporation, Kariya (JP)

( * ) Notice: Subject to any disclaimer, the term of this patent is extended or adjusted under 35 U.S.C. 154(b) by 243 days.

(21) Appl. No.: 13/644,576

(22) Filed: Oct. 4, 2012

(65) Prior Publication Data

US 2013/0119789 A1  May 16, 2013

(30) Foreign Application Priority Data

Nov. 15, 2011  (JP) ................................. 2011-249867

(51) Int. Cl.
*H02K 1/22* (2006.01)

(52) U.S. Cl.
USPC ............................ 310/266; 310/112; 310/113

(58) Field of Classification Search
USPC .................. 310/112–114, 216.006, 266, 269
See application file for complete search history.

(56) References Cited

U.S. PATENT DOCUMENTS

| | | | | |
|---|---|---|---|---|
| 4,814,651 A | * | 3/1989 | Elris et al. ........................ | 310/88 |
| 4,924,125 A | * | 5/1990 | Clark .......................... | 310/67 R |
| 5,744,895 A | * | 4/1998 | Seguchi et al. ................ | 310/266 |
| 5,783,893 A | * | 7/1998 | Dade et al. ..................... | 310/266 |
| 6,424,065 B1 | * | 7/2002 | Vlemmings et al. ............ | 310/89 |
| 6,472,788 B1 | * | 10/2002 | Nakano .......................... | 310/114 |
| 6,590,312 B1 | * | 7/2003 | Seguchi et al. ................ | 310/266 |
| 6,724,115 B2 | * | 4/2004 | Kusase ...................... | 310/156.26 |
| 7,671,501 B2 | * | 3/2010 | Groening ...................... | 310/114 |
| 7,791,245 B1 | * | 9/2010 | Hao et al. ...................... | 310/266 |
| 7,830,064 B2 | * | 11/2010 | Lee et al. ...................... | 310/266 |

FOREIGN PATENT DOCUMENTS

JP    2007-282331    10/2007

* cited by examiner

*Primary Examiner* — Thanh Lam

(74) *Attorney, Agent, or Firm* — Nixon & Vanderhye PC

(57) ABSTRACT

The multiple-gap electric rotating machine includes a rotor cantilever-supported at a first axial end thereof by a rotor arm coupled to a rotating shaft. The rotor includes a laminated core of core sheets made of soft magnetic material and an end-surface core disposed on a surface of the laminated core on a second axial end of the rotor. The laminated core includes segments joined in a ring and each formed with a salient pole structure at each of radially inner and outer peripheries thereof. The end-surface core includes soft magnetic sections made of steel and non-magnetic sections made of stainless steel, which are joined together in a ring. The laminated core is held between the rotor arm and the end-surface core, and fixed to the rotor arm by rivets penetrating through the rotor arm, laminated core and the end -surface core.

18 Claims, 14 Drawing Sheets

(B-B)

(D-D)

MULTIPLE-GAP ELECTRIC ROTATING MACHINE

This application claims priority to Japanese Patent Application No. 2011-249867 filed on Nov. 15, 2011, the entire contents of which are hereby incorporated by reference.

BACKGROUND OF THE INVENTION

1. Field of the Invention

The present invention relates to a multiple-gap electric rotating machine advantageously used as an electric motor or an alternator for a vehicle.

2. Description of Related Art

Japanese Patent Application Laid-open No. 2007-282331 describes a double stator type motor as such a multiple-gap motor. This motor includes an annular rotor constituted of a laminated core of core sheets made of electromagnetic steel, permanent magnets fitted to the inner and outer peripheries of the laminated core, an inner stator disposed radially inside the rotor with a gap therebetween and an outer rotor disposed radially outside the rotor with a gap therebetween. This motor achieves high output power density by the provision of the two gaps between the rotor and the two stators.

The rotor of the motor described in the above patent document has the structure in which two core-holding plates made of aluminum are disposed on both sides of the laminated core, and a coupling disc disposed outside one of the core-holding plates. The laminated core is fastened and fixed to the coupling disc using stud bolts. That is, the rotor has the cantilever structure where it is fastened to the coupling disc at one axial end thereof at which one of the core-holding plates is disposed, and is free at the other axial end thereof at which the other core-holding plate is disposed. In the rotor having such a cantilever structure, the laminated core tends to extend radially outside at the open end thereof due to centrifugal force when the rotor rotates. Although the rotor described in the above patent document includes the aluminum-made core-holding plate disposed on the open end of the laminated core, since the Young's modulus of aluminum is small, it is not possible to sufficiently suppress the extension of the laminated core at the open end thereof.

Further, since the core-holding plates disposed on both sides of the laminated core are made of aluminum, the axial fastening force (pressing force) of the stud bolts is insufficient, and accordingly the holding friction force between the core sheets is weak. Therefore, the rotor described in the above patent document has a problem in that the rigidity of the rotor decreases when the motor rotates and the laminated core cannot endure the centrifugal force applied to the permanent magnets of the rotor. The above patent document describes, as an embodiment, a wheel-in motor which is incorporated in a drive wheel to drive the drive wheel. In this embodiment, the usable speed range of the wheel-in motor is about from 1000 to 2000 rpm. The rotor structure described in the above patent document is applicable to a low speed motor. However, it cannot be applied to a motor directly coupled to an engine whose rotational speed rises up to 7000 rpm.

SUMMARY

An exemplary embodiment provides a multiple-gap electric rotating machine comprising:
a rotating shaft;
a rotor arm coupled to the rotating shaft;
a rotor having an annular shape and cantilever-supported by the rotor arm at a first axial end thereof;
an outer stator disposed radially outside the rotor with a gap therebetween; and
an inner stator disposed radially inside the rotor with a gap therebetween,
the rotor including a laminated core of core sheets made of soft magnetic material and an end-surface core disposed on a surface of the laminated core on a second axial end of the rotor,
the laminated core being held between the rotor arm and the end-surface core and fixed to the rotor arm by coupling members penetrating through the rotor arm, the laminated core and the end-surface core,
wherein
the laminated core includes segments each formed with a salient pole structure at each of radially inner and outer peripheries thereof,
the segments are coupled to one another in a ring by inner and outer bridge members disposed at radially inner and outer peripheries of the laminated core, respectively,
inter-segment space sections are formed between respective circumferentially adjacent two of the segments,
each of the segments is formed with at least one coupling hole for axially passing the coupling member therethrough,
the end-surface core includes soft magnetic sections made of steel and disposed circumferentially corresponding to the segments and non-magnetic sections made of stainless steel and disposed circumferentially corresponding to the inter-segment space sections, each of the soft magnetic sections being formed with a salient pole structure at each of radially inner and outer peripheries thereof, and
the soft magnetic sections and the non-magnetic sections are joined together so that the end-surface core contributes to transmission of magnetic flux between the inner and outer stators in cooperation with the laminated core.

Another exemplary embodiment provides a multiple-gap electric rotating machine comprising:
a rotating shaft;
a rotor arm coupled to the rotating shaft;
a rotor having an annular shape and cantilever-supported by the rotor arm at a first axial end thereof;
an outer stator disposed radially outside the rotor with a gap therebetween; and
an inner stator disposed radially inside the rotor with a gap therebetween,
the rotor including a laminated core of core sheets made of soft magnetic material and an end-surface core disposed on a surface of the laminated core on a second axial end of the rotor,
the laminated core being held between the rotor arm and the end-surface core and fixed to the rotor arm by coupling members penetrating through the rotor arm, the laminated core and the end-surface core,
wherein
the laminated core includes segments each formed with a salient pole structure at each of radially inner and outer peripheries thereof,
the segments are coupled to one another in a ring by inner and outer bridge members disposed at radially inner and outer peripheries of the laminated core, respectively,
inter-segment space sections are formed between respective circumferentially adjacent two of the segments,
each of the segments is formed with at least one coupling hole for axially passing the coupling member therethrough,
the end-surface core includes soft magnetic sections disposed circumferentially corresponding to the segments and non-magnetic sections disposed circumferentially corresponding to the inter-segment space sections, each of the soft magnetic sections being formed with a salient pole structure at each of radially inner and outer peripheries thereof so that the end-surface contributes to transmission of magnetic flux between the inner and outer stators in cooperation with the laminated core, the soft magnetic sections and the non-magnetic sections are formed by subjecting portions of the end-surface core corresponding to the non-magnetic sections to a reforming process for being demagnetized in a case where the entire of the end-surface core is made of steel, or subjecting portions of the end-surface core corresponding to the soft magnetic sections to a reforming process for being magnetized in a case where the entire of the end-surface core is made of stainless steel.

According to each of the exemplary embodiments, there is provided a multiple-gap electric rotating machine including a cantilever-supported rotor having a sufficient resistance to expansion at its open end due to centrifugal force.

Other advantages and features of the invention will become apparent from the following description including the drawings and claims.

PREFERRED EMBODIMENTS OF THE INVENTION

First Embodiment

Figure 1:
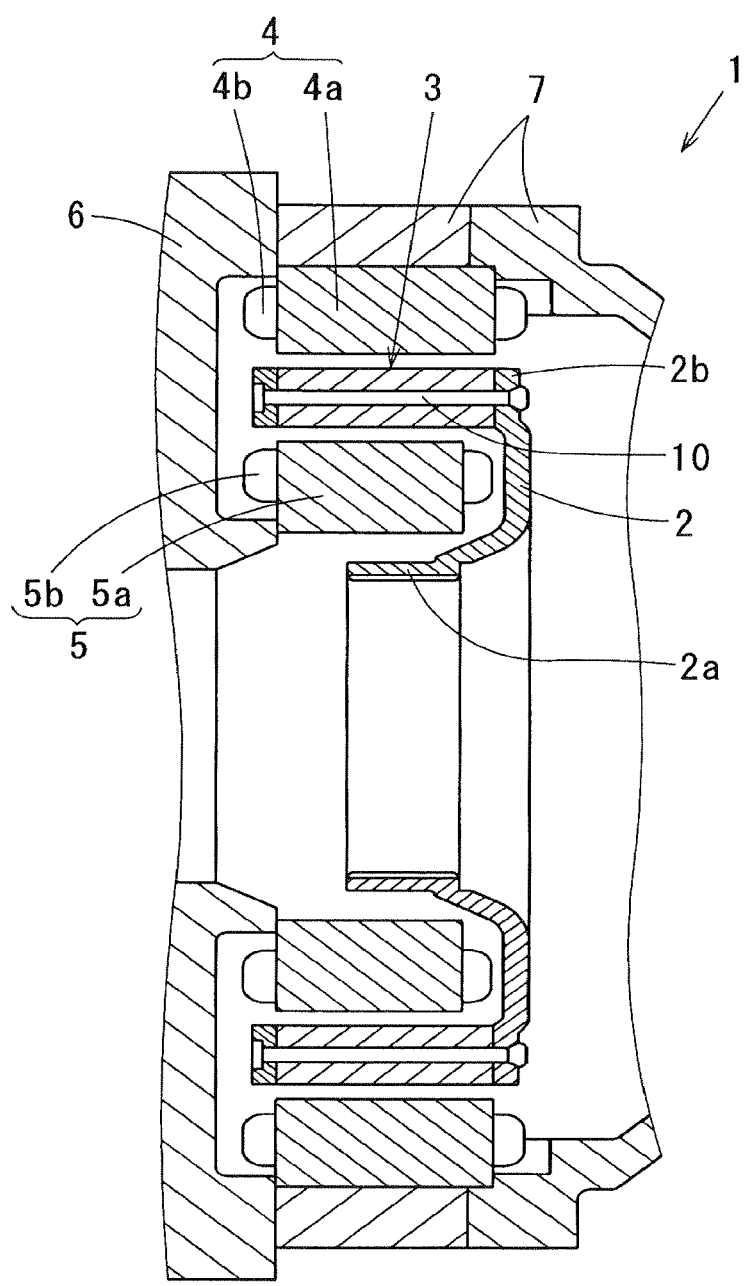
FIG. 1 is a cross-sectional view of a motor as a multiple-gap electric rotating machine according to a first embodiment of the invention.

The multiple-gap electric rotating machine according to a first embodiment of the invention is an electric motor 1 directly coupled to an engine of a hybrid vehicle, which is disposed between the engine and a transmission. As shown in FIG. 1, the motor 1 includes an annular rotor 3, an outer stator 4 and an inner stator 5. The rotor 3 is cantilever-supported by a rotor arm 2 at one axial end thereof. The outer stator 4 is disposed radially outside the rotor 3 with a gap therebetween. The inner stator 5 is disposed radially inside the rotor 3 with a gap therebetween. The motor 1 is accommodated in a motor housing 7 fixed to an engine frame 6. The rotor arm 2 is made of non-magnetic SUS material. The rotor arm 2 includes a cylindrical boss section 2a at its radial center, which is coupled to the crankshaft of the engine through a clutch (not shown).

The outer stator 4 is constituted of an outer core 4a formed with outer slots (not shown) and an outer coil 4b wound on the outer core 4a. The outer slots are formed at even intervals so as to open to the inner periphery of the outer core 4a. The outer coil 4b, which may be a star-connected three-phase coil, is connected to an inverter (not shown). The inner stator 5 is constituted of an inner core 5a formed with inner slots (not shown) and an inner coil 5b wound on the inner core 4a. The inner slots are formed at even intervals so as to open to the outer periphery of the inner core 5a. The inner coil 5b, which may be a star-connected three-phase coil, is connected to an inverter (not shown). The phase coils of the outer coil 4b may be connected to the corresponding phase coils of the inner coil 5b by crossover leads.

Figure 2:
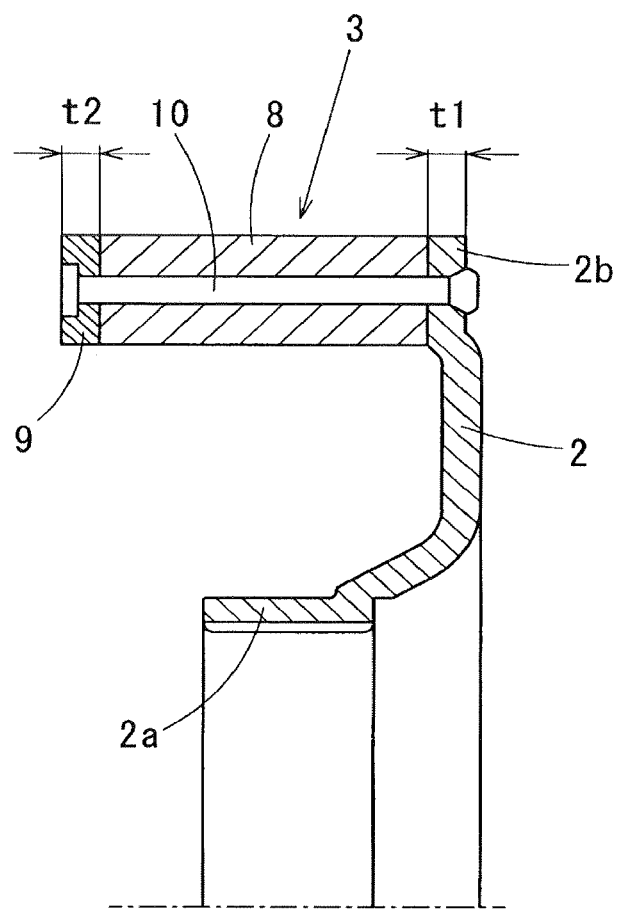
FIG. 2 is a cross-sectional view of a rotor included in the motor according to the first embodiment.
Figure 3:
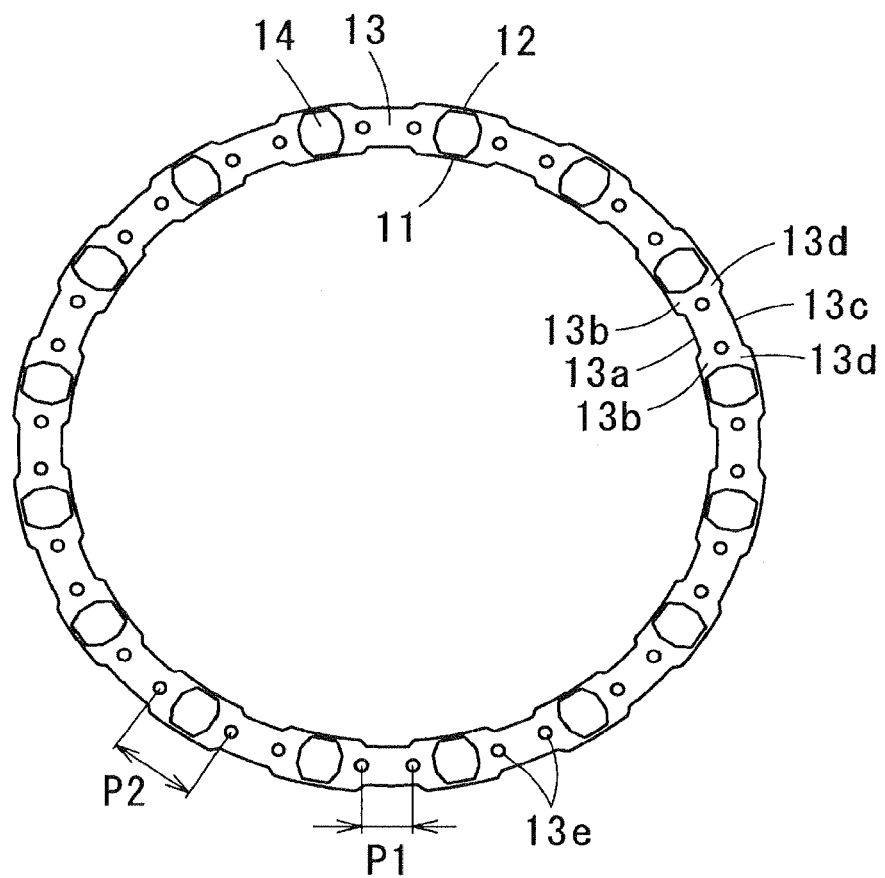
FIG. 3 is a plan view of a laminated core of the rotor of the first embodiment.

As shown in FIG. 2, the rotor 3 is formed by laminating annular core sheets made of soft magnetic material such as electromagnetic steel. The rotor 3 includes a laminated core 8 formed with salient poles at its inner and outer peripheries and an annular end-surface core 9 disposed on one axial end of the laminated core 8, and fixed to an end of the outer periphery of a rotor arm 2 by rivets 10 as a coupling means. As the coupling means, bolts may be used instead of the rivets 10. In the following, the outer periphery of the rotor arm 2 to which the rotor 3 is fixed by the rivets 20 is referred to as a rotor fixing section 2b. As shown in FIG. 3, the laminated core 8 includes an inner bridge member 11 and an outer bridge member 12 disposed radially inside and outside thereof, respectively, and a plurality of segments 13 coupled in a ring by the inner bridge member 11 and the outer bridge member 12. Between the inner and outer bridge members 11 and 12, inter-segment space sections 14 defined by respective circumferentially adjacent two of the segments 13 are formed.

The segment 13 of the laminated core 8 is shaped such that the radial thickness of its circumferential center portion is smaller than that of its end portions. More specifically, the segment 13 is formed with an inner recess 13a dented radially outward at the circumferential center portion of the inner periphery, and both ends of the segment 13 connected to the inner bridge member 11 are formed as salient poles 13b. Further, the segment 13 is formed with an outer recess 13c dented radially inward at the circumferential center portion of the outer periphery, and both ends of the segment 13 connected to the outer bridge member 12 are formed as salient poles 13d. Each of the segments 13 is formed with one or more (two in this embodiment) coupling holes 13e, through which the rivets 10 are passed. As shown in FIG. 3, when the pitch (distance) between two adjacent coupling holes 13e within the same segment 13 is P1, and the pitch (distance)

between two coupling holes 13e adjacent to each other across from the inter-segment space section 14 is P2, the following expression holds.

$$P1 < P2 \quad (1)$$

Figure 4:
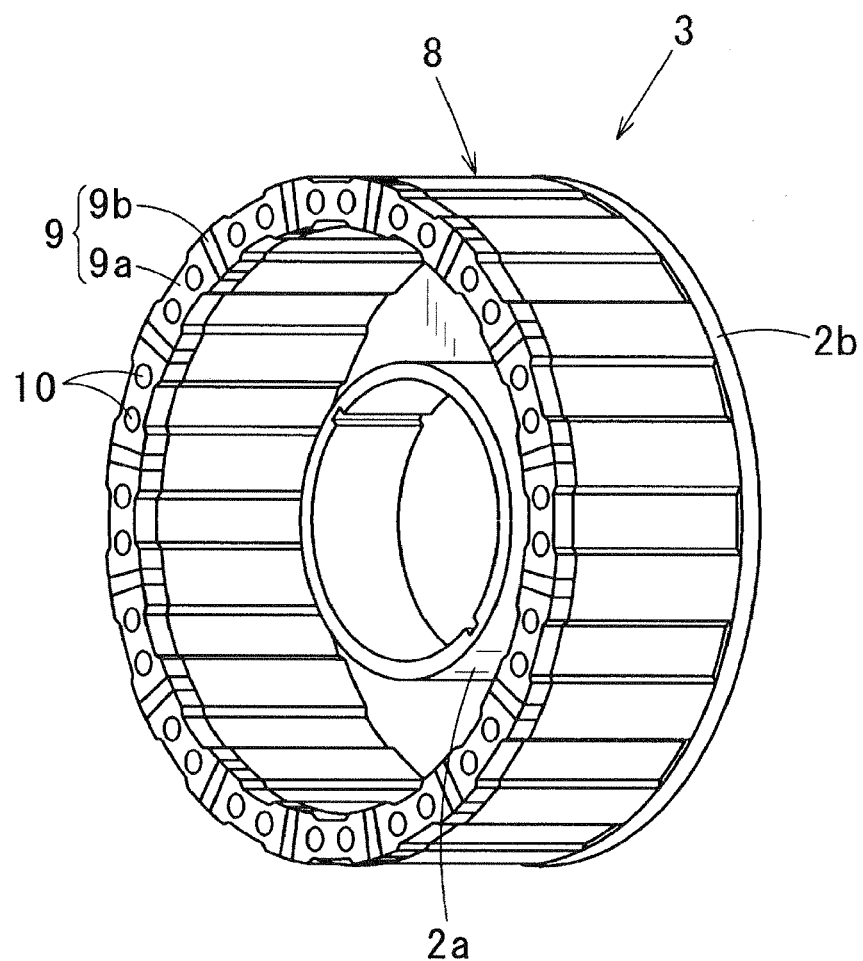
FIG. 4 is a perspective view of the rotor of the first embodiment.
Figure 5:
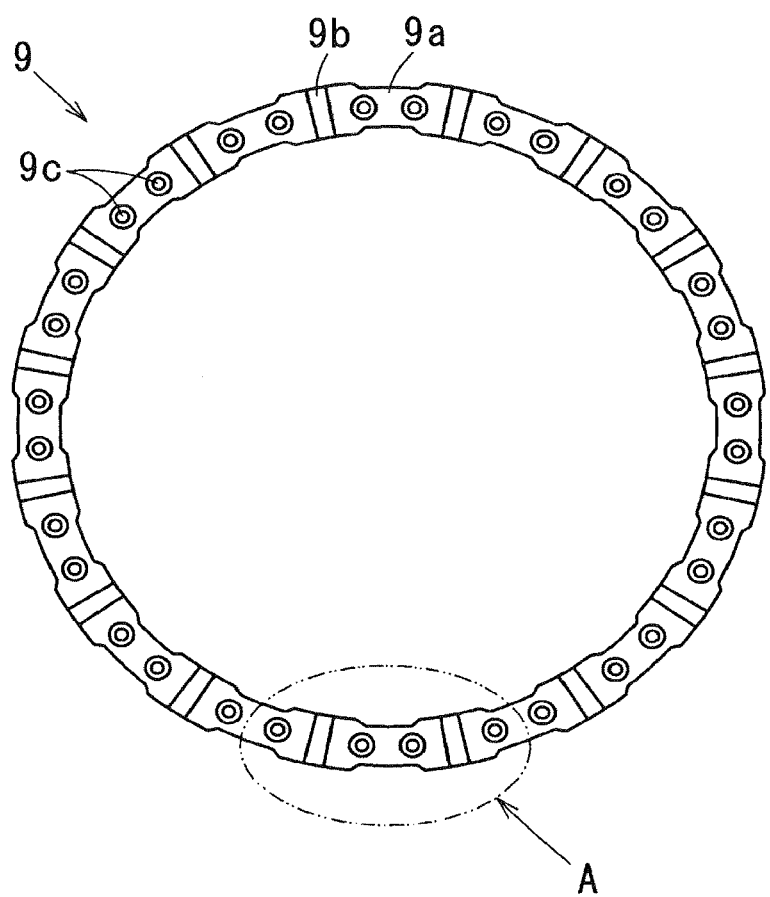
FIG. 5 is a plan view of an end-surface core of the laminated core of the rotor of the first embodiment.
Figure 6A:
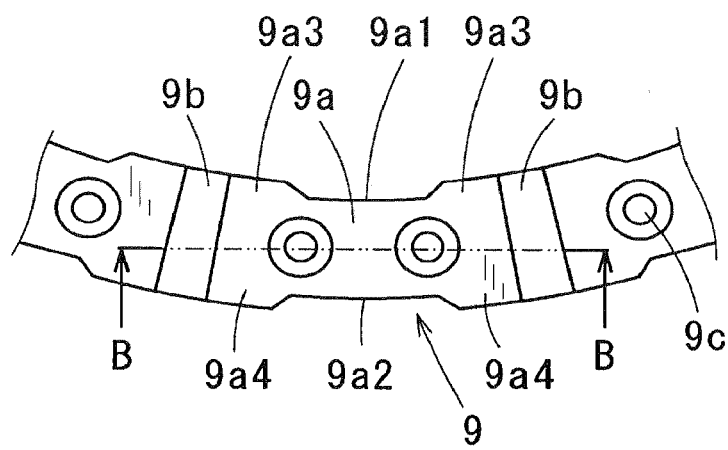
FIG. 6A is a partial enlarged view showing a part (part A) of the end-surface core shown in FIG. 5.

As shown in FIG. 4, the end-surface core 9 includes soft magnetic sections 9a disposed aligned with the circumferential positions of the corresponding segments 13 and non-magnetic sections 9b disposed aligned with the circumferential positions of the corresponding inter-segment space sections 14. As shown in FIG. 5, the soft magnetic section 9a is formed with an uneven portion at each of the inner and outer peripheries thereof. More specifically, as shown in FIG. 6A, the soft magnetic section 9a is formed with recesses 9a1 and 9a2 at the radially inner periphery and the radially outer periphery of the circumferential center portion, respectively, and formed with projections 9a3 and 9a4 at its both circumferential ends. The recesses 9a1 and 9a2 correspond to the inner and outer recesses 13a and 13c, respectively. The projections 9a3 and 9a4 correspond to the salient poles 13b and 13d, respectively. FIG. 6A is a partial enlarged view showing part A of the end-surface core shown in FIG. 5.

Figure 6B:
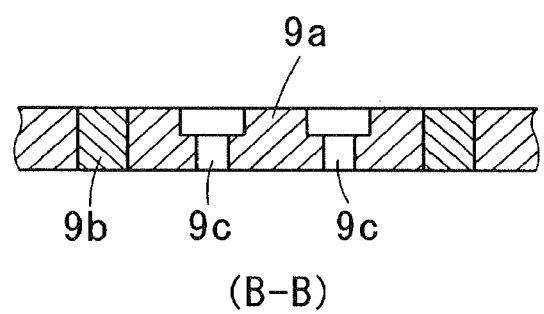
FIG. 6B is a cross-sectional view of the end-surface core taken along line B-B in FIG. 5.

The radial width of the non-magnetic section 9b is the same as that of the ends of the soft magnetic section 9a. The non-magnetic section 9b is disposed between the circumferentially adjacent soft magnetic sections 9a. The soft magnetic section 9a is made of steel, and the non-magnetic section 9b is made of stainless steel. They are joined to each other by laser welding or the like to constitute the end-surface core 9. As shown in FIG. 6b, the soft magnetic section 9a of the end-surface core 9 is formed with a coupling hole 9c penetrating through the magnetic section 9a in the thickness direction (in the vertical direction in FIG. 6B) through which the rivet 10 is inserted. This coupling hole 9c is in alignment with the coupling hole 13e formed in the segment 13 of the laminated core 8 in the radial direction.

The sheet thickness (the thickness in the axial direction) of the end-surface core 9 is nearly the same or greater than that of the rotor fixing section 2b. In this embodiment, as shown in FIG. 2, when the sheet thickness of the rotor fixing section 2b is t1, and the sheet thickness of the end-surface core 9 is t2, the following expressions holds.

$$t1 \leq t2 \quad (2)$$

The rotor 3 is fixed to the rotor fixing section 2b in a state of being pressed in the axial direction by inserting the rivets 10 through the coupling holes 9c of the end-surface core 9 and the coupling holes 13e of the segments 13, and swaging the tip ends of the rivets 10 protruding from the coupling holes formed in the rotor fixing section 2b.

The first embodiment described above provides the following advantages. The motor 1 has the structure in which the end-surface core 9 is disposed on the free end side (the other axial end side) of the rotor 3 cantilever-supported by the rotor arm 2, and this end-surface core 9 is formed by joining the soft magnetic sections 9a made of steel and the non-magnetic sections 9b made of stainless steel. Accordingly, since the end-surface core 9 has a Young's modulus of the same level of that of steel, and the sheet thickness t2 of the end-surface core 9 is larger than the sheet thickness t1 of the rotor fixing section 2b, the end-surface core 9 is hard to be elastically deformed. By disposing this end-surface core 9 on the open end side of the rotor 3, it is possible to suppress the free end side of the rotor 3 from extending radially outward due to centrifugal force which occurs when the rotor 3 rotates, to increase the resistance of the rotor 3 to centrifugal force. Since the Young's modulus of the end-surface core 9 used in this embodiment is larger than that of the aluminum-made core pressing plate used in the motor described in the foregoing patent document, the fastening force (axial pressing force) of the rivets 10 applied to the laminated core 8 between the end-surface core 9 and the rotor fixing section 2b does not decrease. Accordingly, since a sufficient frictional force works between the laminated layers of the laminated core 8, the core sheets which are low in rigidity and joined together by the inner and outer bridge members 11 and 12 can be prevented from moving radially outward.

The end-surface core 9 includes the soft magnetic sections 9a circumferentially arranged corresponding to the respective segments 13 of the laminated core 8, and the non-magnetic sections 9b circumferentially arranged corresponding to the respective inter-segment space sections 14 of the laminated core 8. Each of the soft magnetic sections 9a is formed with the uneven portion at each of the inner and outer peripheries thereof. Accordingly, since the end-surface core 9 not only serves as a reinforcing member for suppressing the open end side of the rotor 3 from extending outside due to centrifugal force, but also contributes to transmission of magnetic flux in cooperation with the laminated core 8 between the outer stator 4 and the inner stator 5, a higher power can be outputted.

The laminated core 8 is formed with the two coupling holes 13e for each one of the segments 13 so that each segment 13 is fixed by the two rivets 20. Accordingly, since each segment 13 can be prevented from turning around the rivet 10, it is possible to prevent the segments 13 from being loosened. Further, if the rivets 10 are made of soft magnetic material, since the coupling holes 13e formed in the segments 13 are filled with the soft magnetic material, there is no concern that the coupling holes 13 would interrupt the flow of magnetic flux.

Second Embodiment

Figure 7:
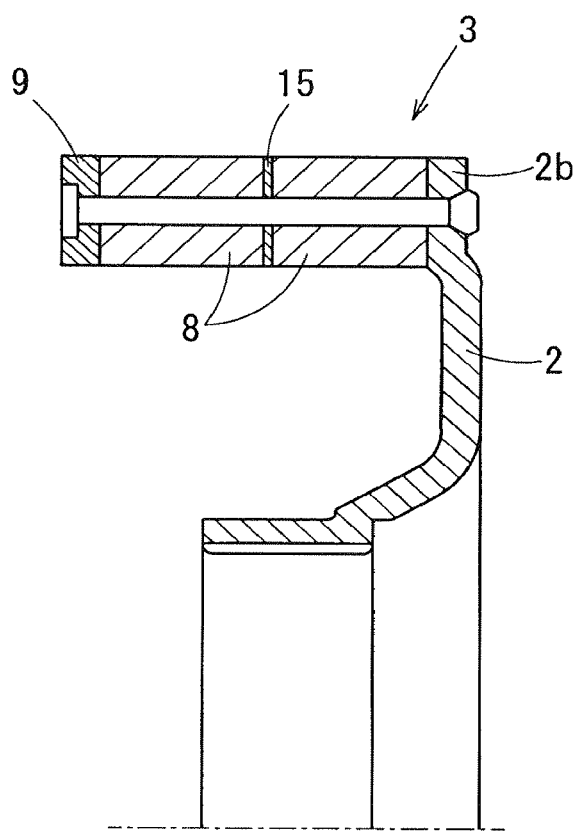
FIG. 7 is a cross-sectional view of a rotor included in a motor as a multiple-gap electric rotating machine according to a second embodiment of the invention.
Figure 8:
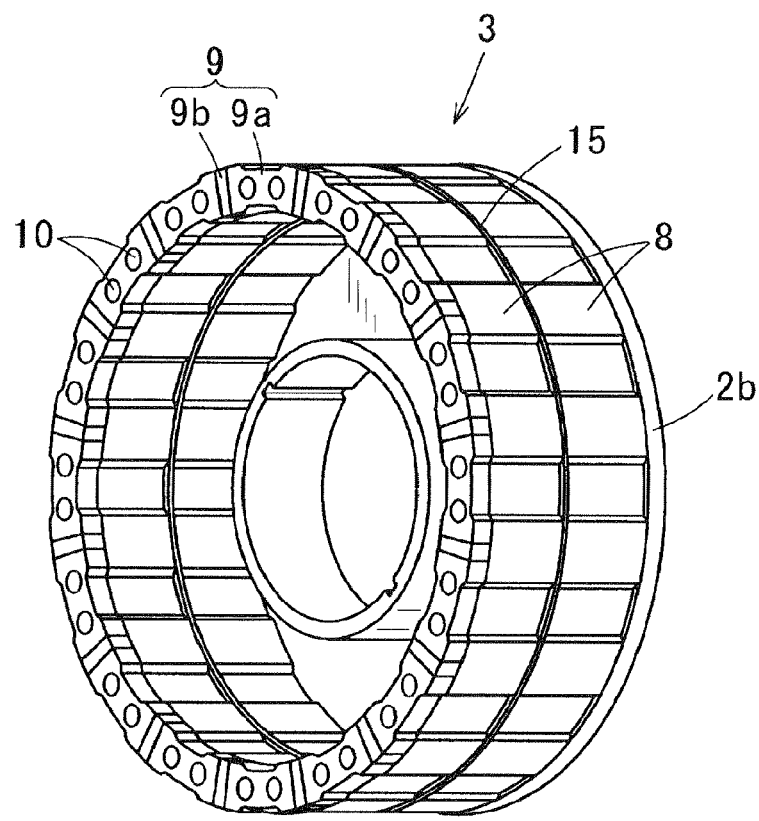
FIG. 8 is a perspective view of the rotor of the second embodiment.
Figure 9:
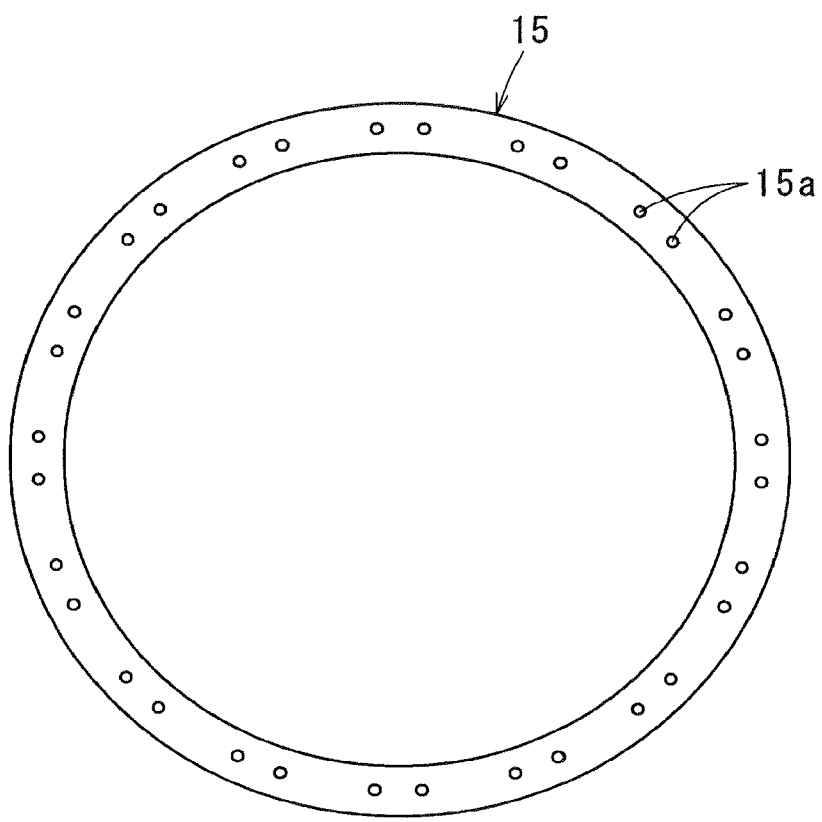
FIG. 9 is a plan view of an intermediate disc included in the rotor of the second embodiment.

Next a second embodiment of the invention is described. In this embodiment, components which are the same as those of the above described first embodiment are indicated by the same reference numerals or characters. As shown in FIGS. 7 and 8, the second embodiment describes an example in which an intermediate disc 15 is disposed in the axially intermediate portion of the laminated core 8. FIG. 7 is a cross-sectional view of the rotor 3. FIG. 8 is a perspective view of the rotor 3. As shown in FIG. 9, the intermediate disc 15 has a ring shape not formed with an uneven portion. The intermediate disc 15 is formed with coupling holes 15a at a plurality of positions for passing the rivets 10. The intermediate disc 15 is not formed with the inter-segment space sections 14. Accordingly its resistance to centrifugal force is greater than that of the core sheets of the laminated core 8. The intermediate disc 15 is made of non-magnetic material such as stainless steel, and its sheet thickness is smaller than that of the end-surface core 9 (see FIG. 7). In the second embodiment, since the intermediate disc 15 whose resistance to centrifugal force is higher than that of the core sheets is put in the axially intermediate portion of the laminated core 8, it is possible to suppress the axially center portion of the laminated core 8 from expanding outside.

Since the intermediate disc 15 is made of non-magnetic material, it does not serve as a magnetic circuit. However, the effect of torque reduction due to the intermediate disc 15 can be reduced compared to a case where the intermediate disc 15 is made of magnetic material and accordingly flux leakage occurs. The rotor 3 cantilever-supported by the rotor arm 2 undergoes the effect of extension due to centrifugal force most at the end-surface core 9 disposed on the free end. On the other hand, the rotor 3 undergoes the effect least at the intermediate disc 15 located in the middle between the end-surface core 9 and the rotor fixing section 2*b*. Accordingly, since it is possible to make the sheet thickness of the intermediate disc 15 smaller than that of the end-surface core 9, the effect of torque reduction due to the provision of the intermediate disc 15 made of non-magnetic material in the axially intermediate portion of the laminated core 8 can be reduced.

Third Embodiment

Figure 10:
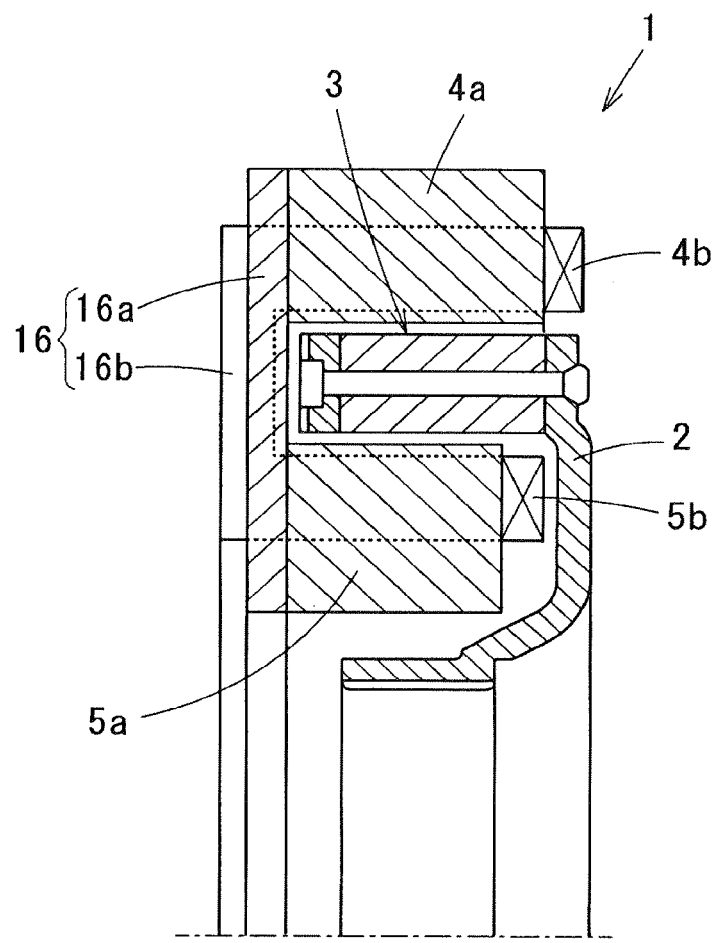
FIG. 10 is a partial cross-sectional view of a motor as a multiple-gap electric rotating machine according to a third embodiment of the invention.

Next a third embodiment of the invention is described. In this embodiment, components which are the same as the above described embodiments are indicated by the same reference numerals or characters. The third embodiment describes an example in which a lateral stator 16 is disposed on the side of the axially other end of the rotor 3. As shown in FIG. 10, the lateral stator 16 is constituted of a lateral core 16*a* connecting the outer core 4*a* and the inner core 5*a*, and a lateral coil 16*b* wound on the lateral core 16*a*. The lateral core 16*a* is connected to the axially other end of the outer core 4*a* at its radially outer periphery and connected to the axially other end of the inner core 5*a* at its radially inner periphery. The lateral core 16*a* includes a rotor-opposite surface opposite to the axially other end of the end-surface core 9. The rotor-opposite surface is formed with lateral slots (not shown) for accommodating the lateral coil 16*b*. The lateral slots are formed so as to make connection between the outer slots formed in the outer core 4*a* and the inner slots formed in the inner core 5*a*. As shown in FIG. 10, the lateral coil 16*b* is formed so as to connect the outer coil 4*b* to the inner coil 5*b* in a shape of a mirror-shaped C.

Figure 11:
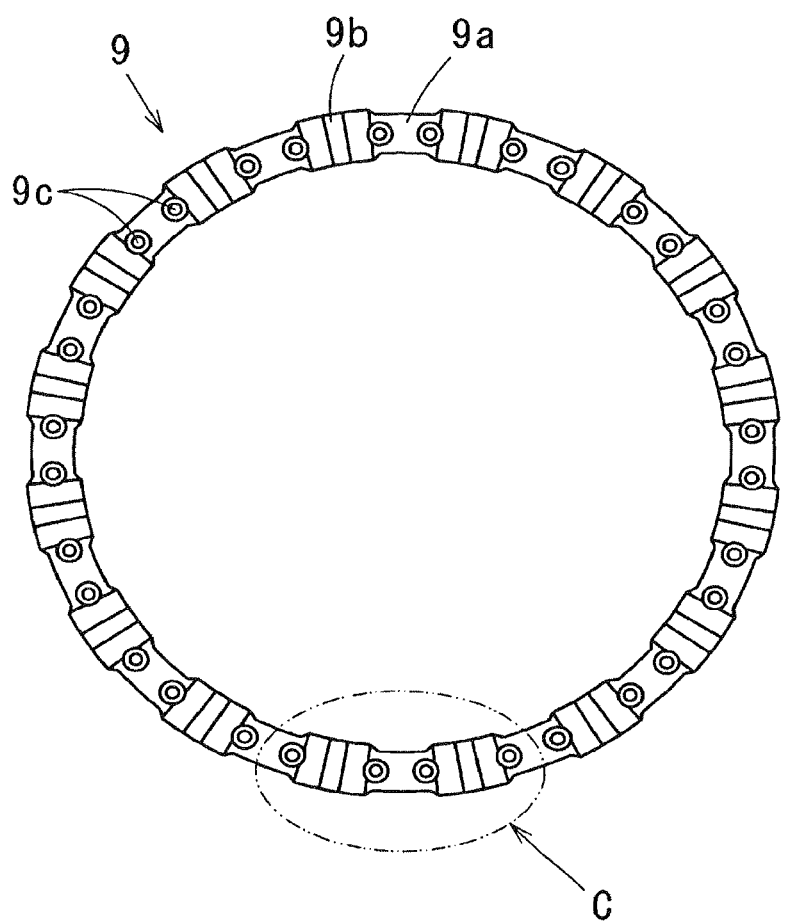
FIG. 11 is a plan view of a rotor of included in the motor according to the third embodiment.
Figure 12A:
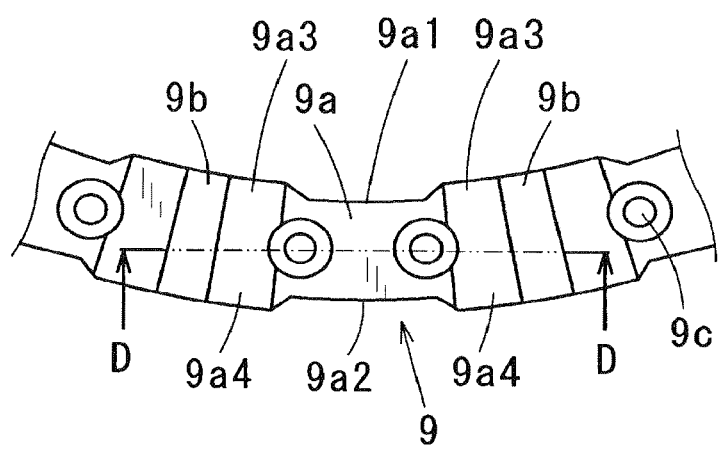
FIG. 12A is a partial enlarged view showing a part (part C) of an end-surface core included in the rotor shown in FIG. 11.
Figure 12B:
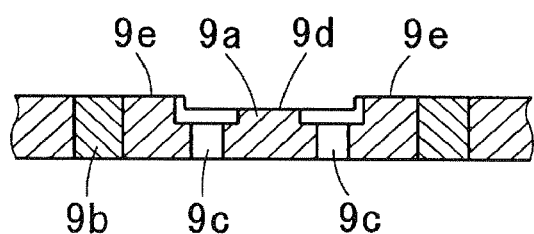
FIG. 12B is a cross-sectional view of the end-surface core taken along line D-D in FIG. 11.

As shown in FIG. 11, the end-surface core 9 is formed by connecting the soft magnetic sections 9*a* and the non-magnetic sections 9*b* in a ring as is the case with the first embodiment. As shown in FIG. 12A, the soft magnetic section 9*a* is formed with an uneven portion at each of the inner and outer peripheries thereof. FIG. 12A is a partial enlarged view showing part C of the end-surface core 9 shown in FIG. 11. As shown in FIG. 12B, the end-surface core 9 is formed with a recess 9*d* dented in the thickness direction at its circumferential center portion. Projections 9*e* are formed at both ends of the recess 9*d* corresponding to the positions of the salient poles of the corresponding segment 13. In the third embodiment, in addition to the magnetic gaps provided between the rotor 3 and each of the outer and inner stators 4 and 5, a magnetic gap in the axial direction is provided between the end-surface core 9 and the lateral stator 16. The motor according to the third embodiment has the three magnetic gaps, and accordingly can generate more torque than the motor according to the first embodiment.

Fourth Embodiment

Figure 13:
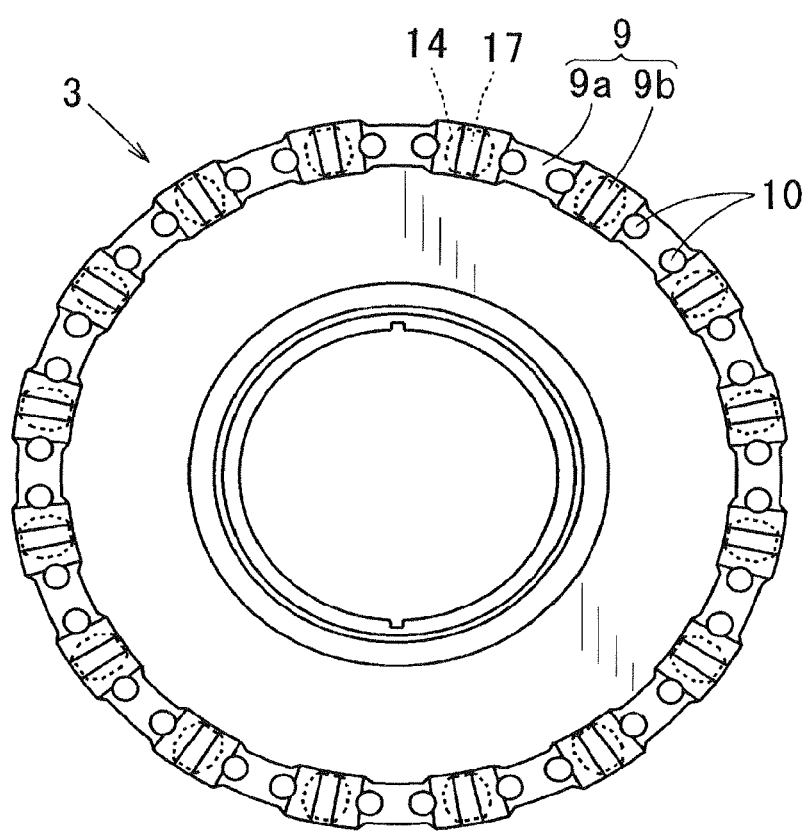
FIG. 13 is a plan view of a rotor included in a motor as a multiple-gap electric rotating machine according to a fourth embodiment of the invention.

Next a fourth embodiment of the invention is described. In this embodiment, components which are the same as the above described embodiments are indicated by the same reference numerals or characters. The fourth embodiment describes an example in which permanent magnets 17 are inserted in the inter-segment space sections 14 of the laminated core 8 as shown in FIG. 13. FIG. 13 is an axial plan view of the rotor 3 as viewed from the side of end-surface core 9. As shown in FIG. 4, the permanent magnets 17 are disposed in one axial end side and the other axial end side of each inter-segment space section 14 which are separated from each other by the intermediate disc 15. The permanent magnets 17 are magnetized in the circumferential direction. Each two of the permanent magnets 17 adjacent in the circumferential direction are disposed such that their magnetic poles adjacent in the circumferential direction have the same polarity. Incidentally, in FIG. 14, the laminated core 8 is omitted from illustration to clearly show the fitting state of the permanent magnets 17. The motor 1 according to the fourth embodiment in which the permanent magnets 17 are provided in the inter-segment space sections 14 of the laminated core 8 can generate further more torque using the magnet torque in addition to the reluctance torque.

The permanent magnet 17 disposed in the one axial end side of the inter-segment space section 14 is supported by the rotor fixing section 2*b* at one axial end surface thereof and supported by the intermediate disc 15 at the other axial end surface thereof. The permanent magnet 17 disposed in the other axial end side of the inter-segment space section 14 is supported by the intermediate disc 15 at one axial end surface thereof and supported by the end-surface core 9 at the other axial end surface thereof. Since the permanent magnet 17 is disposed in the closed space whose axial ends are closed, it is possible to prevent the permanent magnet 17 from falling out in the axial direction from the inter-segment space section 14 without providing a protection cover or the like.

Further since the foregoing expression of P1<P2 holds, although the laminated core 8 is fixed in a sate of being pressed in the axial direction by the rivets 10 inserted through the coupling holes 13*e*, the permanent magnets 17 suffer less damage because the pressing force applied to the permanent magnets 17 disposed in the inter-segment space sections is lessened.

Figure 14:
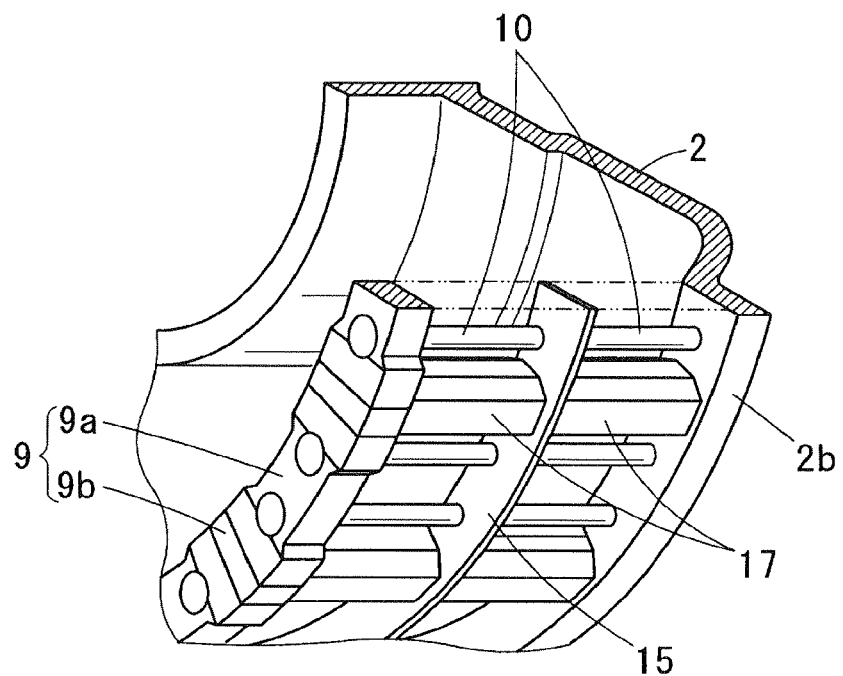
FIG. 14 is a perspective view showing a part of the rotor attached with permanent magnets of the fourth embodiment.
Figure 15:
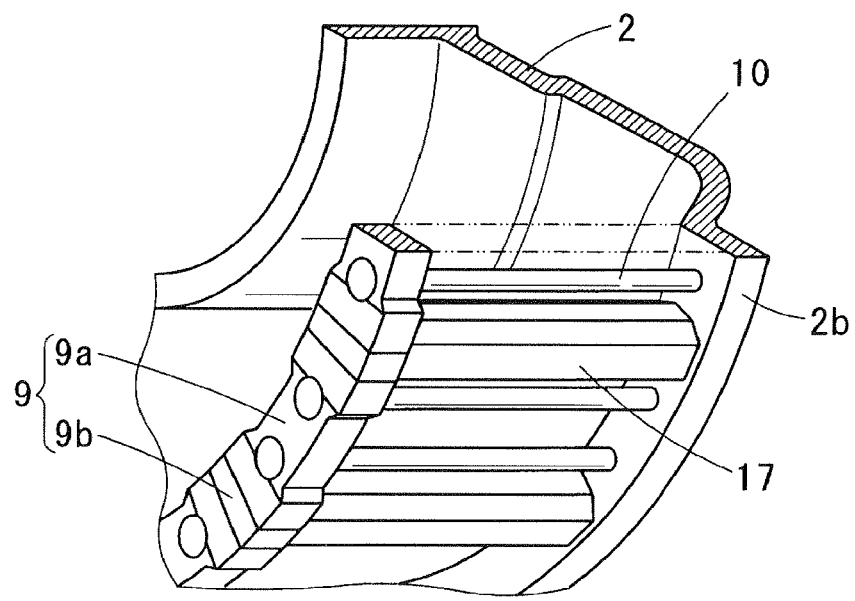
FIG. 15 is a perspective view showing a part of the rotor attached with the permanent magnets of the fourth embodiment.

Incidentally, FIG. 14 shows the structure in which the intermediate disc 15 is disposed in the axial center portion of the laminated core 8. However, needless to say, the permanent magnets 17 can be used for a structure not including the intermediate disc 15 as shown in FIG. 15.

Modifications

The end-surface core 9 described in the first embodiment is formed by joining the soft magnetic section 9*a* made of steel and the non-magnetic section 9*b* made of stainless steel together by laser welding. However, it is also possible that the entire of the end-surface core 9 is made of steel, a portion of the end-surface core 9 corresponding to the non-magnetic section 9*b* is subjected to a reforming process for being demagnetized, and a portion of the end-surface core 9 corresponding to the soft magnetic section 9*a* is subjected to a reforming process for being magnetized. In the first embodiment, the radial width of the non-magnetic section 9*b* is the same as that of both ends of the soft magnetic section 9*b*. However, in the case where the soft magnetic section 9*a* made of steel and the non-magnetic section made of stainless steel are joined together by welding, since there is possibility that the welded portion expands and protrudes from the inner and outer peripheries, causing the outer core 4*a* and the inner core 5*a* to interfere with each other, an appropriate post processing is needed. To eliminate such a post processing, the non-magnetic section 9*b* may be more dented in the radial direction than the soft magnetic section 9*a*.

The end-surface core 9 described in the first embodiment serves as not only a reinforcing member for suppressing the open end side of the rotor 3 from extending outward due to centrifugal force, but also works for transmitting magnetic flux in cooperation with the laminated core 8 between the outer stator 4 and the inner stator 5. Although the end-surface core 9 includes the soft magnetic section 9*a* and the non-magnetic section 9*b*, and the soft magnetic section 9*a* is formed with the salient pole structure, the function of transmitting the magnetic flux between the outer stator 4 and the inner stator 5 may be omitted. This is because an end-surface pressing plate having a simple shape of a ring can be used instead of the end-surface core 9. This end-surface pressing plate may be made of non-magnetic metal having a Young's modulus as high as steel (stainless steel, for example) so that it has a capability of sufficiently suppressing extension of the rotor 3 due to centrifugal force.

The above explained preferred embodiments are exemplary of the invention of the present application which is described solely by the claims appended below. It should be understood that modifications of the preferred embodiments may be made as would occur to one of skill in the art.

What is claimed is:

1. A multiple-gap electric rotating machine comprising:
a rotating shaft;
a rotor arm coupled to the rotating shaft;
a rotor having an annular shape and cantilever-supported by the rotor arm at a first axial end thereof;
an outer stator disposed radially outside the rotor with a gap therebetween; and
an inner stator disposed radially inside the rotor with a gap therebetween,
the rotor including a laminated core of core sheets made of soft magnetic material and an end-surface core disposed on a surface of the laminated core on a second axial end of the rotor,
the laminated core being held between the rotor arm and the end-surface core and fixed to the rotor arm by coupling members penetrating through the rotor arm, the laminated core and the end-surface core,
wherein
the laminated core includes segments each formed with a salient pole structure at each of radially inner and outer peripheries thereof,
the segments are coupled to one another in a ring by inner and outer bridge members disposed at radially inner and outer peripheries of the laminated core, respectively,
inter-segment space sections are formed between respective circumferentially adjacent two of the segments,
each of the segments is formed with at least one coupling hole for axially passing the coupling member therethrough,
the end-surface core includes soft magnetic sections made of steel and disposed circumferentially corresponding to the segments and non-magnetic sections made of stainless steel and disposed circumferentially corresponding to the inter-segment space sections, each of the soft magnetic sections being formed with a salient pole structure at each of radially inner and outer peripheries thereof, and
the soft magnetic sections and the non-magnetic sections are joined together so that the end-surface core contributes to transmission of magnetic flux between the inner and outer stators in cooperation with the laminated core.

2. The multiple-gap electric rotating machine according to claim 1, wherein
the rotor arm includes a rotor fixing section to which the laminated core held between the rotor arm and the end-surface core is fixed, and
a sheet thickness of the end-surface core is larger than a sheet thickness of the rotor fixing section.

3. The multiple-gap electric rotating machine according to claim 1, wherein the rotor includes an intermediate disc disposed in an axially intermediate portion of the laminated core, the intermediate disc having an annular shape and a higher resistance to centrifugal force than the core sheets.

4. The multiple-gap electric rotating machine according to claim 3, wherein the intermediate disc is made of non-magnetic material, and has a sheet thickness larger than the end-surface core.

5. The multiple-gap electric rotating machine according to claim 1, wherein each of the segments of the laminated core is formed with the two or more coupling holes, the coupling member being inserted into each of the coupling holes to fix the laminated core to the rotor arm.

6. The multiple-gap electric rotating machine according to claim 1, further comprising a lateral stator disposed axially opposite to the end-surface core with a gap therebetween, and the end-surface core is formed with a salient pole structure at an end surface thereof opposite to the lateral stator.

7. The multiple-gap electric rotating machine according to claim 1, wherein the coupling means is a bolt or rivet made of soft magnetic material.

8. The multiple-gap electric rotating machine according to claim 1, wherein permanent magnets are disposed in each of the inter-segment space sections, the permanent magnets being magnetized in a circumferential direction of the rotor such that each two of the permanent magnets adjacent in the circumferential direction have the same polarity.

9. The multiple-gap electric rotating machine according to claim 8, wherein
each of the segments of the laminated core is formed with the two coupling holes, and
when a pitch between the two adjacent coupling holes of the same segment is P1, and a pitch between the two coupling holes adjacent to each other across from the inter-segment space section is P2, an expression of P1<P2 holds.

10. A multiple-gap electric rotating machine comprising:
a rotating shaft;
a rotor arm coupled to the rotating shaft;
a rotor having an annular shape and cantilever-supported by the rotor arm at a first axial end thereof;
an outer stator disposed radially outside the rotor with a gap therebetween; and
an inner stator disposed radially inside the rotor with a gap therebetween,
the rotor including a laminated core of core sheets made of soft magnetic material and an end-surface core disposed on a surface of the laminated core on a second axial end of the rotor,
the laminated core being held between the rotor arm and the end-surface core and fixed to the rotor arm by coupling members penetrating through the rotor arm, the laminated core and the end-surface core,
wherein
the laminated core includes segments each formed with a salient pole structure at each of radially inner and outer peripheries thereof,
the segments are coupled to one another in a ring by inner and outer bridge members disposed at radially inner and outer peripheries of the laminated core, respectively,
inter-segment space sections are formed between respective circumferentially adjacent two of the segments,
each of the segments is formed with at least one coupling hole for axially passing the coupling member therethrough,
the end-surface core includes soft magnetic sections disposed circumferentially corresponding to the segments and non-magnetic sections disposed circumferentially corresponding to the inter-segment space sections, each of the soft magnetic sections being formed with a salient pole structure at each of radially inner and outer peripheries thereof so that the end-surface contributes to transmission of magnetic flux between the inner and outer stators in cooperation with the laminated core,
the soft magnetic sections and the non-magnetic sections are formed by subjecting portions of the end-surface core corresponding to the non-magnetic sections to a reforming process for being demagnetized in a case where the entire of the end-surface core is made of steel, or subjecting portions of the end-surface core corresponding to the soft magnetic sections to a reforming process for being magnetized in a case where the entire of the end-surface core is made of stainless steel.

11. The multiple-gap electric rotating machine according to claim 10, wherein the rotor arm includes a rotor fixing section to which the laminated core held between the rotor arm and the end-surface core is fixed, and a sheet thickness of the end-surface core is larger than a sheet thickness of the rotor fixing section.

12. The multiple-gap electric rotating machine according to claim 10, wherein the rotor includes an intermediate disc disposed in an axially intermediate portion of the laminated core, the intermediate disc having an annular shape and a higher resistance to centrifugal force than the core sheets.

13. The multiple-gap electric rotating machine according to claim 12, wherein the intermediate disc is made of non-magnetic material, and has a sheet thickness larger than the end-surface core.

14. The multiple-gap electric rotating machine according to claim 10, wherein each of the segments of the laminated core is formed with the two or more coupling holes, the coupling member being inserted into each of the coupling holes to fix the laminated core to the rotor arm.

15. The multiple-gap electric rotating machine according to claim 10, further comprising a lateral stator disposed axially opposite to the end-surface core with a gap therebetween, and the end-surface core is formed with a salient pole structure at an end surface thereof opposite to the lateral stator.

16. The multiple-gap electric rotating machine according to claim 15, wherein the coupling means is a bolt or rivet made of soft magnetic material.

17. The multiple-gap electric rotating machine according to claim 10, wherein permanent magnets are disposed in each of the inter-segment space sections, the permanent magnets being magnetized in a circumferential direction of the rotor such that each two of the permanent magnets adjacent in the circumferential direction have the same polarity.

18. The multiple-gap electric rotating machine according to claim 17, wherein each of the segments of the laminated core is formed with the two coupling holes, and when a pitch between the two adjacent coupling holes of the same segment is P1, and a pitch between the two coupling holes adjacent to each other across from the inter-segment space section is P2, an expression of P1<P2 holds.

* * * * *